United States Patent
Lee et al.

(10) Patent No.: US 12,505,034 B2
(45) Date of Patent: Dec. 23, 2025

(54) MEMORY SYSTEM AND OPERATION METHOD THEREOF

(71) Applicant: Yangtze Memory Technologies Co., Ltd., Hubei (CN)

(72) Inventors: Byoungwoon Lee, Wuhan (CN); Jiawei Chen, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/437,333

(22) Filed: Feb. 9, 2024

(65) Prior Publication Data
US 2025/0094333 A1    Mar. 20, 2025

(30) Foreign Application Priority Data
Sep. 20, 2023    (CN) .................. 202311229338.X

(51) Int. Cl.
*G06F 12/02*    (2006.01)
(52) U.S. Cl.
CPC .................. *G06F 12/0246* (2013.01)
(58) Field of Classification Search
CPC ........ G06F 12/0246; G11C 2207/2254; G11C 29/023; G11C 29/028
See application file for complete search history.

(56) References Cited

U.S. PATENT DOCUMENTS

| | | | |
|---|---|---|---|
| 10,218,343 B1 | 2/2019 | Tomar et al. | |
| 10,707,851 B1 | 7/2020 | Song et al. | |
| 11,309,876 B2 | 4/2022 | Doppalapudi et al. | |
| 11,694,752 B2 | 7/2023 | Xie | |
| 11,803,327 B2 | 10/2023 | Song | |
| 2016/0062656 A1* | 3/2016 | Ramaraju | G11C 16/10 711/103 |
| 2022/0052678 A1* | 2/2022 | Choi | G11C 8/10 |
| 2022/0392520 A1* | 12/2022 | Kim | G11C 11/4096 |
| 2023/0118731 A1 | 4/2023 | Balasubrahmanyam et al. | |
| 2023/0377621 A1* | 11/2023 | Lee | G11C 11/4076 |
| 2023/0386600 A1* | 11/2023 | Lee | G11C 29/52 |
| 2024/0046976 A1* | 2/2024 | Pilolli | G11C 16/10 |

FOREIGN PATENT DOCUMENTS

| | | |
|---|---|---|
| CN | 106909314 A | 6/2017 |
| CN | 111124998 A | 5/2020 |
| CN | 111126615 A | 5/2020 |
| CN | 115458006 A | 12/2022 |
| CN | 116110447 A | 5/2023 |

OTHER PUBLICATIONS

Office Action in Chinese Appln. No. 202311229338.X, mailed on Aug. 29, 2025, 26 pages (with machine translation).

* cited by examiner

Primary Examiner — Zhuo H Li
(74) Attorney, Agent, or Firm — Fish & Richardson P.C.

(57) ABSTRACT

An example of the present application provides a memory system and an operation method thereof. In one example, the memory system includes a memory device; the operation method may include: in response to a write duty cycle adjustment (WDCA) being performed for a data strobe (DQS) signal of the memory device, configuring an adjustment code that adjusts the duty cycle of the DQS signal; the adjustment code represents the step size of adjustment for adjusting the duty cycle of the DQS signal; generating an adjustment signal in accordance with the adjustment code; adjusting the duty cycle of the DQS signal in accordance with the adjustment signal.

20 Claims, 18 Drawing Sheets

MEMORY SYSTEM AND OPERATION METHOD THEREOF

CROSS-REFERENCE TO RELATED APPLICATIONS

This application claims priority to Chinese Patent Application No. 202311229338.X, filed on Sep. 20, 2023, which is hereby incorporated by reference in its entirety.

FIELD OF TECHNOLOGY

The present application relates to the field of storage technology, and in particular to a memory system and operation method thereof.

BACKGROUND

As the performance of Double Data Rate (DDR) random access memory continues to be improved, the requirements for the accuracy of operating also continues to increase, and the current duty cycle adjustment of data strobe (DQS) may not meet the requirements.

SUMMARY

In view of this, an example of the present application provides a memory system and an operation method thereof.

In a first aspect, an example of the present application provides a method for operating a memory system, wherein the memory system includes a memory device; the method includes:

in response to a write duty cycle adjustment WDCA for a data strobe DQS signal of the memory device, configuring an adjustment code that adjusts the duty cycle of the DQS signal; the adjustment code is to represent the step size of adjustment for adjusting the duty cycle of the DQS signal;
  generating an adjustment signal in accordance with the adjustment code;
  adjusting the duty cycle of the DQS signal in accordance with the adjustment signal.

In the scheme described above, the WDCA further includes:

writing known data to the memory device in accordance with the adjusted DQS signal;
  determining whether the known data is able to be read correctly;
  in response to the result of the determining including that the known data is able to be read correctly, marking the adjustment code as adjustment pass; in response to the result of the determining including that the known data is not able to be read correctly, marking the adjustment code as adjustment failure.

In the scheme described above, the determining whether the known data is able to be read correctly includes:

reading the memory device to obtain a first data signal related to the known data;
  comparing the first data signal and a second data signal; the second data signal includes a reference data signal based on the known data;
  in response to the first data signal and the second data signal meeting a preset condition, the result of the determining including that the known data is able to be read correctly;
  in response to the first data signal and the second data signal not meeting a preset condition, the result of the determining including that the known data is not able to be read correctly.

In the scheme described above, the method further includes:

in response to the end of the current WDCA, determining whether a number of times that the WDCA is performed reaches a set number;
  in response to a number of times that the WDCA is performed not reaching the set number, initiating a next WDCA; stopping initiating a next WDCA until a number of times that the WDCA is performed reaches the set number;
  wherein the step sizes of adjustments represented by the adjustment codes in WDCAs are different from each other.

In the scheme described above, the method further includes:

obtaining adjustment codes which are marked as adjustment pass in multiple WDCAs as candidate adjustment codes;
  determining a target adjustment code in accordance with the candidate adjustment codes;
  wherein the target adjustment code is to generate a target DQS signal; data is able to be correctly written into the memory device based on the target DQS signal within the variation range of PVT in the memory device.

In the scheme described above, the determining a target adjustment code in accordance with the candidate adjustment codes includes:

determining a group of candidate codes which contains the largest number of consecutive candidate adjustment codes;
  determining the target adjustment code from the group of candidate codes;
  Wherein, any of candidate adjustment codes in the group of candidate codes is determined to be the target adjustment code; or a candidate adjustment code which is close to the middle position in the group of candidate codes is determined to be the target adjustment code.

In the scheme described above, the memory device supports the open NAND flash interface ONFI protocol, and the adjustment code is set into the memory device in accordance with a Set Feature command in the ONFI protocol.

In the scheme described above, the plurality of adjustment codes in the multiple WDCAs include adjustment codes in positive and negative directions;

wherein at least one of the rising edge or falling edge of the DQS signal is adjusted in accordance with the adjustment code in the positive direction to increase the duty cycle of the DQS signal; at least one of the rising edge or falling edge of the DQS signal is adjusted in accordance with the adjustment code in the negative direction to reduce the duty cycle of the DQS signal.

In the scheme described above, the adjustment code includes a plurality of bits; wherein the highest bit is to indicate whether the adjustment code is an adjustment code in a positive or negative direction; remaining bits are to indicate the step size of adjustment for the adjustment code.

In the scheme described above, the adjustment code includes 5 bits, wherein the highest bit is to indicate whether the adjustment code is an adjustment code in a positive or negative direction; remaining 4 bits are to indicate the step size of adjustment for the adjustment code; wherein the adjustment code is able to achieve a total of 32 different step sizes of adjustment from −16 to 16.

In the scheme described above, the DQS signal includes a single-ended signal or a differential signal.

In a second aspect, an example of the present disclosure provides a memory system including:
one or more memory devices;
and a memory controller which is coupled to the memory device and to control the memory device; wherein,
the memory controller is configured to: in response to a write duty cycle adjustment WDCA being performed for a write data strobe DQS signal of the memory device, configure an adjustment code that adjusts the duty cycle of the DQS signal into the memory device; the adjustment code is to represent the step size of adjustment for adjusting the duty cycle of the DQS signal;
the memory device is configured to: obtain the adjustment code; generate an adjustment signal in accordance with the adjustment code; adjust the duty cycle of the DQS signal in accordance with the adjustment signal.

In the scheme described above, the memory device includes a peripheral circuit configured to: configure the adjustment code into a first register included in the peripheral circuit; access the first register to obtain the adjustment code; generate an adjustment signal in accordance with the adjustment code; adjust the duty cycle of the DQS signal in accordance with the adjustment signal.

In the scheme described above, the peripheral circuit includes: a control logic sub-circuit, a digital-to-analog conversion sub-circuit and a DQS input buffer sub-circuit, wherein,
the control logic sub-circuit is configured to: access the first register to obtain the adjustment code; transmit the adjustment code to the digital-to-analog conversion sub-circuit;
the digital-to-analog conversion sub-circuit is configured to: receive the adjustment code; generate an adjustment signal in accordance with the adjustment code; the adjustment signal includes a reference voltage signal;
the DQS input buffer sub-circuit is configured to adjust the duty cycle of the DQS signal in accordance with the reference voltage signal.

In the scheme described above, the memory device further includes a memory array; the memory array is coupled to the peripheral circuit and controlled by the peripheral circuit;
the memory controller is further configured to: send a write command;
the peripheral circuit is further configured to: in response to the write command, write known data to the memory array in accordance with the adjusted DQS signal;
the memory controller is further configured to: send a read command;
the peripheral circuit is further configured to: in response to the read command, feed back to the memory controller a first data signal related to the known data;
the memory controller is further configured to: determine whether the known data is able to be read correctly in accordance with the first data signal and the second data signal; in response to the result of the determining including that the known data is able to be read correctly, marking the adjustment code as adjustment pass; in response to the result of the determining including that the known data is not able to be read correctly, marking the adjustment code as adjustment failure; wherein the second data signal includes a reference data signal based on the known data.

In the scheme described above, the memory controller is further configured to: in response to the end of the current WDCA, determine whether a number of times that the WDCA is performed reaches a set number; in response to a number of times that the WDCA is performed not reaching the set number, initiate a next WDCA; stop initiating a next WDCA until a number of times that the WDCA is performed reaches the set number;
wherein the step sizes of adjustment represented by the adjustment codes in WDCAs are different from each other.

In the scheme described above, the memory controller is further configured to: obtain adjustment codes which are marked as adjustment pass in multiple WDCAs as candidate adjustment codes; determine a target adjustment code in accordance with the candidate adjustment codes;
wherein the target adjustment code is to generate a target DQS signal; data is able to be correctly written into the memory device based on the target DQS signal within the variation range of PVT in the memory device.

In the scheme described above, the memory device is configured to: support an open NAND flash interface ONFI protocol; the set command includes a Set Feature command in the ONFI protocol.

In the scheme described above, the memory controller is further configured to: compare the first data signal and the second data signal;
in response to the first data signal and the second data signal meeting a preset condition, the result of the determining including that the known data is able to be read correctly;
in response to the first data signal and the second data signal not meeting a preset condition, the result of the determining including that the known data is not able to be read correctly.

In the scheme described above, the plurality of adjustment codes in the multiple WDCAs include adjustment codes in positive and negative directions;
wherein at least one of the rising edge or falling edge of the DQS signal is adjusted in accordance with the adjustment code in the positive direction to increase the duty cycle of the DQS signal; at least one of the rising edge or falling edge of the DQS signal is adjusted in accordance with the adjustment code in the negative direction to reduce the duty cycle of the DQS signal.

An example of the present application provides a memory system and an operation method thereof, wherein the memory system includes a memory device; the operation method may include: in response to a write duty cycle adjustment WDCA for a data strobe DQS signal of the memory device, configuring an adjustment code that adjusts the duty cycle of the DQS signal; the adjustment code is to represent the step size of adjustment for adjusting the duty cycle of the DQS signal; generating an adjustment signal in accordance with the adjustment code; adjusting the duty cycle of the DQS signal in accordance with the adjustment signal. The operation method provided by the example of the present application, when the duty cycle of DQS is to be adjusted, may configure the adjustment code for adjusting DQS to the memory device, so that the memory device adjusts the DQS in accordance with the adjustment code, thereby the adjustment of the duty cycle of the DQS may be flexibly controlled.

BRIEF DESCRIPTION OF THE DRAWINGS

In the accompanying drawings, which are not necessarily drawn to scale, like reference numerals may describe similar components in the different views. The same number with a different letter suffix may represent different instances of a similar component. The accompanying drawings generally illustrate, by way of example and not limitation, various examples discussed in this document.

DETAILED DESCRIPTION

Figure 1:
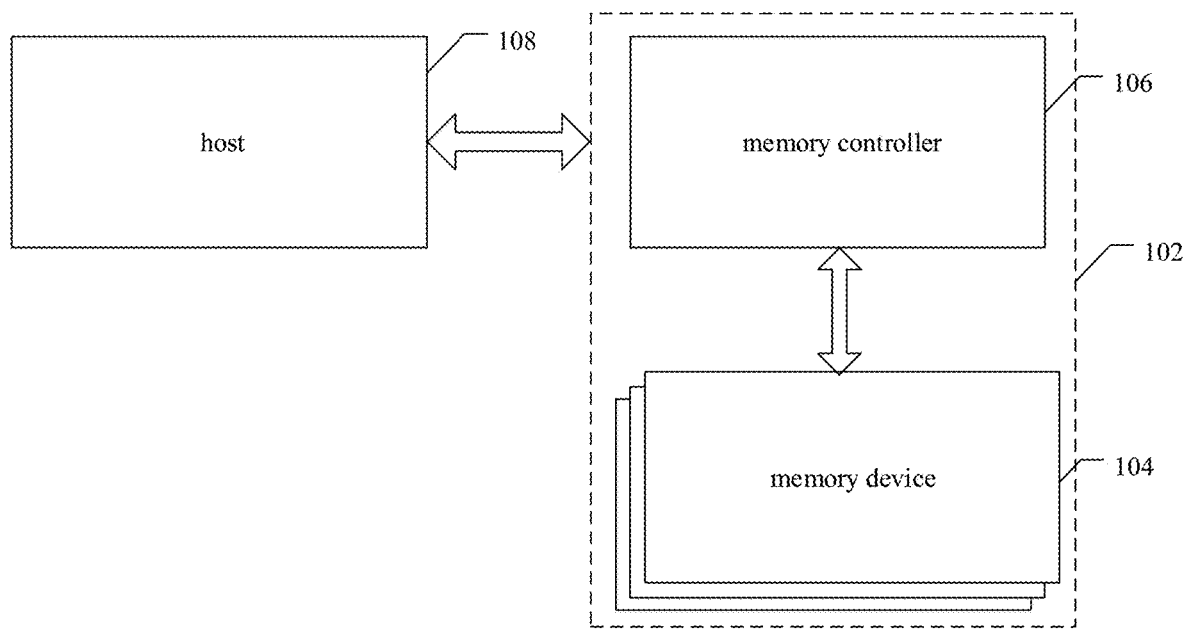
FIG. 1 is a schematic diagram of an example system having a memory system provided by an example of the present application.

Various examples of the present application are described in more detail below with reference to the accompanying drawings. Other examples that are variations of any disclosed example may be formed by differently configuring or arranging elements and features of the examples of the present application. Therefore, the examples of the present application are not limited to the examples set forth herein. Rather, the described examples are provided so that the examples of the present application may be thorough and complete, and may fully convey the scope of the examples of the present application to those skilled in the art to which the examples of the present application belong. It may be noted that references to "an example," "another example," etc., do not necessarily refer to only one example, and that different references to any such phrase are not necessarily to the same example. It may be understood that although the terms "first," "second," "third," etc., may be used herein to identify various elements, these elements should not be limited by these terms. These terms are to distinguish one element from another element having the same or similar name. Therefore, a first element in an example may also be referred to as a second element or third element in another example without departing from the spirit and scope of the examples of the present application.

The accompanying drawings may or may not be drawn to scale and in some instances the scale may have been exaggerated to clearly illustrate features of the examples. When an element is referred to as being connected or coupled to another element, it may be understood that the former may be directly connected or coupled to the latter or electrically connected or coupled to the latter via one or more intervening elements therebetween. In addition, it should also be understood that when an element is referred to as being "between" two elements, it may be the only element between the two elements, or one or more intervening elements may also be present.

The terminology used herein is for the purpose of describing particular examples only and is not intended to be limiting of the present application. As used herein, singular forms are intended to include plural forms unless the context clearly dictates otherwise. Unless otherwise stated or clearly understood as a singular form from the context, the articles "a" and/or "an" used in the examples of the present application and the appended claims shall be collectively interpreted as meaning "one or more". It may be further understood that the terms "comprise", "comprising", "include" and "including" used in the examples of the present application indicate the presence of stated elements and do not exclude the presence or addition of one or more other elements. The term "and/or" used in the examples of the present application includes any and all combinations of one or more of the associated listed items. Unless otherwise defined, all terms including technical and scientific terms used in the examples of the present application have the same meanings as commonly understood by one of ordinary skill in the art to which the present application belongs in view of the examples of the present application. It may be further understood that, unless clearly defined by the examples of the present application, terms such as those defined in commonly used dictionaries may be interpreted as having meanings consistent with their meanings in the context of the examples of the present application and related technologies, and should not be interpreted in an idealized or overly formal way.

In the following description, numerous details are set forth in order to provide a thorough understanding of the present application, and the present application may be practiced without some or all of these details. In other instances, well known processing structures and/or processes are not described in detail so as not to unnecessarily obscure the present application. It should also be understood that in some cases, unless stated otherwise, it may be apparent to a person skilled in the relevant art that features or elements described with respect to one example may be used alone or in combination with other features or elements of another example. Hereinafter, various examples of the present application are described in detail with reference to the accompanying drawings. The following description focuses on details to facilitate understanding of examples of the present application. Well-known technical details may be omitted so as not to obscure the features and aspects of the examples of the application.

Examples of the present application may be further described in detail below in conjunction with the accompanying drawings and examples.

FIG. 1 is a schematic diagram of an example system with a memory system provided by an example of the present application. In FIG. 1, the system 100 may be a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having memory system therein. As shown in FIG. 1, the system 100 may include a host 108 and a memory system 102, where the host 108 may include a processor, e.g., a Central Processing Unit (CPU) or a System of Chip (SoC), where the SoC may be, e.g., an Application Processor (AP). The host 108 also includes at least one operating system (OS) that may generally manage and control the functions and operations performed in the host 108. The OS may enable interoperability between a host 108 coupled to the memory system 102 and users who need and use the memory system 102. The OS may support functions and operations corresponding to the request of the user, e.g., without limitation, depending on whether the type of the host 108 is a removable host, the OS may be classified into a general-purpose operating system and a mobile operating system, wherein the general-purpose operating system may include personal operating system and enterprise operating system, and the personal operating system may be operating systems for supporting services for general purposes, including Windows and Chrome; and the enterprise operating system may be an operating system dedicated to ensuring and supporting higher performance, including Windows server, Linux, and Unix. The mobile operating system may refer to an operating system for mobility services or functions (e.g., a power saving function), and generally speaking, the mobile operating system may be an operating system such as Android, iOS, and Windows Mobile, etc. In some examples, the host 108 may include a plurality of OSs; accordingly, the host 108 may run a plurality of operating systems related to the memory system 102. In some other examples, the host 108 converts the request of the user into one or more commands, and transmits the one or more commands to the memory system 102, so that the memory system 102 performs operations associated with the one or more commands.

Wherein the memory system 102 is capable of operating or performing a function or performing internal various operations in response to a request from the host 108. In some examples, memory system 102 is capable of storing data accessed by host 108. Memory system 102 may act as a primary memory system or a secondary memory system for host 108. The memory system 102 and the host 108 may be electrically connected and communicate in accordance with corresponding protocols. The memory system 102 may be implemented and packaged into different types of terminal electronic products, including, for example and without limitation: Solid State Drives (SSD), Multimedia Cards (MMC), Embedded MMC (eMMC), Reduced Size MMC (RSMMC), Micro MMC, Secure Digital (SD) cards, Mini SD, Micro SD, Universal Serial Bus (USB) storage devices, Universal Flash Storage (UFS) devices, Compact Flash (CF) cards, Smart Media (SM) cards and memory sticks, etc.

In some examples, memory system 102 may also be configured as part of, e.g., a computer, Ultra Mobile PC (UMPC), workstation, netbook, Personal Digital Assistant (PDA), portable computer, web tablet, tablet computer, wireless telephone, mobile phone, smart phone, e-book, portable multimedia players (PMP), portable game console, navigation system, black box, digital camera, Digital Multimedia Broadcasting (DMB) player, three-dimensional (3D) TV, smart TV, digital audio recorder, digital audio player, digital picture recorder, digital picture player, digital video recorder, digital video player, a storage device for configuring a data center, a device capable of transmitting and receiving information in a wireless environment, one of various electronic devices for configuring a home network, one of various electronic devices for configuring a computer network, one of various electronic devices for configuring a telematics network, a Radio Frequency Identification (RFID) device, or one of various components for configuring a computing system.

Figure 2A:
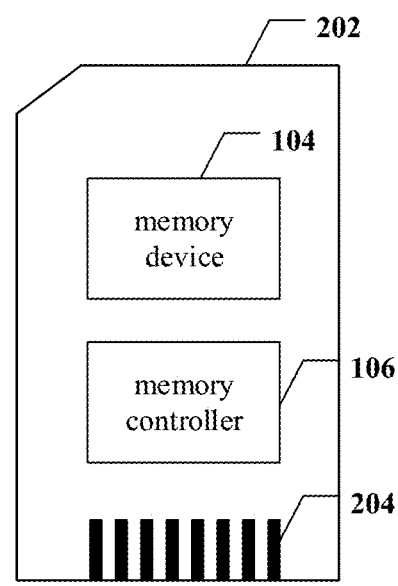
FIG. 2a is a schematic diagram of an example memory card having a memory system provided by an example of the present application.
Figure 2B:
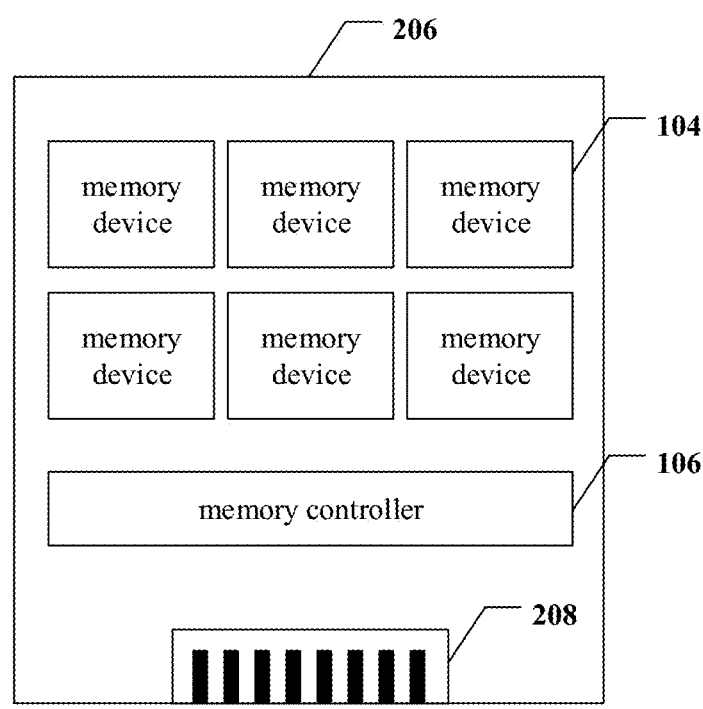
FIG. 2b is a schematic diagram of an example solid state drive having a memory system provided by an example of the present application.

Referring back to FIG. 1, the memory system 102 may include one or more memory devices 104 and a memory controller 106. The memory controller 106 may respond to the request of the host 108, and in turn control the memory device 104, e.g., the memory controller 106 may read data from the storage memory device 104, and transmit the read data to the host 108; it may also receive data to be stored from the host 108, and store the data to be stored into the memory device 104. That is, the memory controller 106 is capable of controlling write (or program) operation, read operation, erase operation, background operation, etc., of the memory device 104. The memory system 102 may be implemented and packaged into different types of end electronic products. In one example as shown in FIG. 2a, memory controller 106 and a single memory device 104 may be integrated into a memory card 202. Memory card 202 may include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 may further include a memory card connector 24 coupling memory card 202 with a host (e.g., host 108 in FIG. 1). In another example as shown in FIG. 2b, memory controller 106 and a plurality of memory devices 104 may be integrated into a SSD 206. SSD 206 may further include an SSD connector 208 coupling the SSD 206 with a host (e.g., host 108 in FIG. 1). In some implementations, at least one of the storage capacity or operating speed of SSD 206 is greater than at least one of the storage capacity or operating speed of memory card 202.

Figure 3:
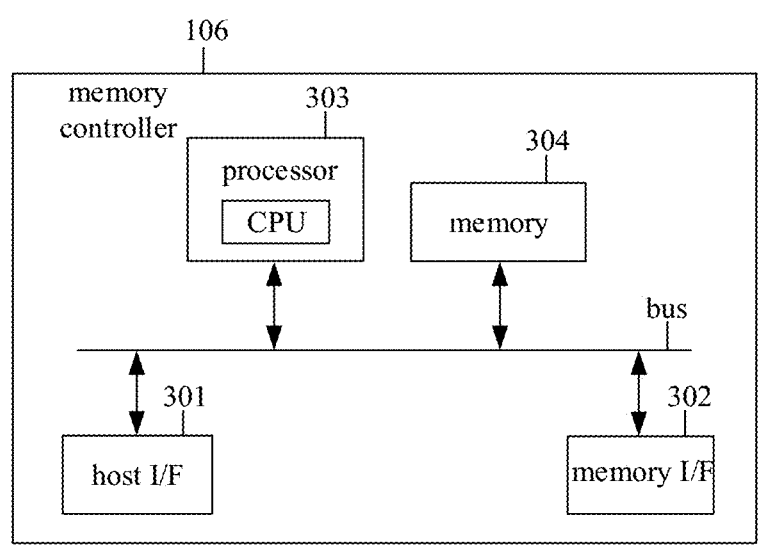
FIG. 3 is a structure schematic diagram of a memory controller provided by an example of the present application.

Wherein, as shown in FIG. 3, the memory controller 106 may include a host I/F (or a front-end interface) 301, a memory I/F (or a back-end interface) 302, a processor 303, and a memory 304, wherein the above-mentioned components 301, 302, 303, and 304 in the memory controller 106 may share transmission signals inside the memory controller 106 through an internal bus. In some examples, in response to the protocol of the host 108, the host I/F 301 may interface the host 108 with the memory system 102, and the host I/F 301 exchanges transmission commands and data operations between the host 108 and the memory system 102. The host I/F 301 may process commands and data sent by the host computer, and may include at least one of Universal Serial Bus (USB), MultiMedia Card (MMC), Peripheral Component Interconnect Express (PCI-e or PCIe), Small Computer System Interface (SCSI), Serial SCSI (SAS), Serial Advanced Technology Attachment (SATA), Parallel Advanced Technology Attachment (PATA), Small Computer System Interface (SCSI), Enhanced Small Disk Interface (ESDI), and Integrated Drive Electronics (IDE). In some examples, the host I/F 301 is a component of the memory system 102 for exchanging data with the host 108 and may be implemented by firmware referred to as Host Interface Layer (HIL).

The memory I/F 302 may include an interface for commands and data transferred between memory controller 106 and memory device 104, allowing memory controller 106 to in response to requests communicated from host 108, control memory device 104. The memory I/F 302 may generate control signals for controlling the memory device 104. In some examples, if the memory device 104 is a NAND flash memory, the memory I/F 302 may write data into the memory device 104 or read data from the memory device 104 under the control of the processor 303. The memory I/F 302 may process commands and data between the memory controller 106 and the memory device 104, e.g., operations of a NAND flash interface, especially operations between the memory controller 106 and the memory device 104. In accordance with an example, the memory I/F 302 may be implemented as a component for exchanging data with the memory device 104 through firmware referred to as Flash Interface Layer (FIL). In some examples, the memory I/F 302 may support the Open NAND Flash interface (ONFI) protocol. In some other examples, the memory I/F 302 may also support the Toggle protocol.

The processor 303 may be implemented by a microprocessor or a central processing unit (CPU). The memory system 102 may include one or more processors 303. The processor 303 may control all the operations of the memory system 102. By way of example and not limitation, in response to a write request or a read request from the host 108, the processor 303 may control a program operation or a read operation of the memory device 104. In accordance with an example, the processor 303 may use or run firmware to control all the operation of the memory system 102. In the present application, a firmware may be referred to as a Flash Translation Layer (FTL). The FTL may operate as an interface between the host 108 and the memory device 104. The host 108 may transmit requests related to write operations and read operations to the memory device 104 through the FTL. For example, the memory controller 106 uses the processor 303 when performing an operation requested from the host 108 in the memory device 104. A processor 303 coupled to the memory device 104 may process instructions or commands related to commands from the host 108. The memory controller 106 may perform a foreground operation such as a command operation corresponding to a command input from the host 108, e.g., a program operation corresponding to a write command, a read operation corresponding to a read command, and an erase/discard operation corresponds to an erase/discard command, and a parameter set operation corresponds to a set parameter command or a set feature command with a set command.

For another example, the memory controller 106 may perform background operations on the memory device 104 through the processor 303. By way of example and not limitation, these background operations may include Garbage Collection (GC) operation, Wear Leveling (WL) operation, mapping clear operation, and bad block management operation that checks or searcher for bad blocks. The garbage collection operation may include an operation of copying and processing data stored in a certain memory block in the memory device 104 to another memory block. The wear leveling operation may include an operation of exchanging and processing stored data among memory blocks of the memory device 104. The mapping clear operation may include an operation of storing mapping data stored in the memory controller 106 into memory blocks of the memory device 104. The bad block management operation may include an operation of checking and processing bad blocks in memory blocks of the memory device 104. The memory controller 106 may respond to an operation of accessing memory blocks of the memory device 104, wherein the operation of accessing memory blocks of the memory device 104 may include performing a foreground operation or background operation on memory blocks of the memory device 104.

The memory 304 may be a working memory of the memory controller 106 configured to store data for driving the memory controller 106. In one example, when the memory controller 106 controls the memory device 104 in response to a request from the host 108, the memory 304 may store firmware driven by the processor 303 and data (e.g., metadata) required to drive the firmware. The memory 304 may also be a buffer memory of memory controller 106 configured to temporarily store write data transferred from host 108 into memory device 104 and read data transferred from memory device 104 to host 108. The memory 304 may include program memory, data memory, write buffer/cache, read buffer/cache, data buffer/cache, and mapping buffer/cache for storing write data and read data. The memory 304 may be implemented with volatile memory. The memory 304 may be implemented with Static Random Access Memory (SRAM), Dynamic Random Access Memory (DRAM), or both.

Although FIG. 3 shows the memory 304 being included in memory controller 106, the present application is not limited thereto. In an implementation, the memory 304 may be included external to the memory controller 106, and the memory controller 106 may input and output data to and from the memory 304 through a separate memory interface (not shown).

Referring back to FIG. 1, memory device 104 may include a non-volatile memory that retains data stored therein even when it is not supplied with power. The memory device 104 may also include volatile storage memory. The device 104 may store data provided from the host 108 through a write operation; the memory device 104 may also provide the stored data to the host 108 through a read operation. In an example of the present application, the memory device 104 may include any memory disclosed, e.g., a volatile memory device such as dynamic random access memory (DRAM) and static RAM (SRAM), or a non-volatile memory device such as read-only memory (ROM), Mask ROM (MROM), Programmable ROM (PROM), Erasable Programmable ROM (EPROM), Electrically Erasable Programmable ROM (EEPROM), Ferroelectric RAM (FRAM), Phase Change RAM (PRAM), Magnetoresistive RAM (MRAM), Resistive RAM (RRAM or ReRAM) and Flash memory (e.g. 3D NAND Flash).

Figure 4:
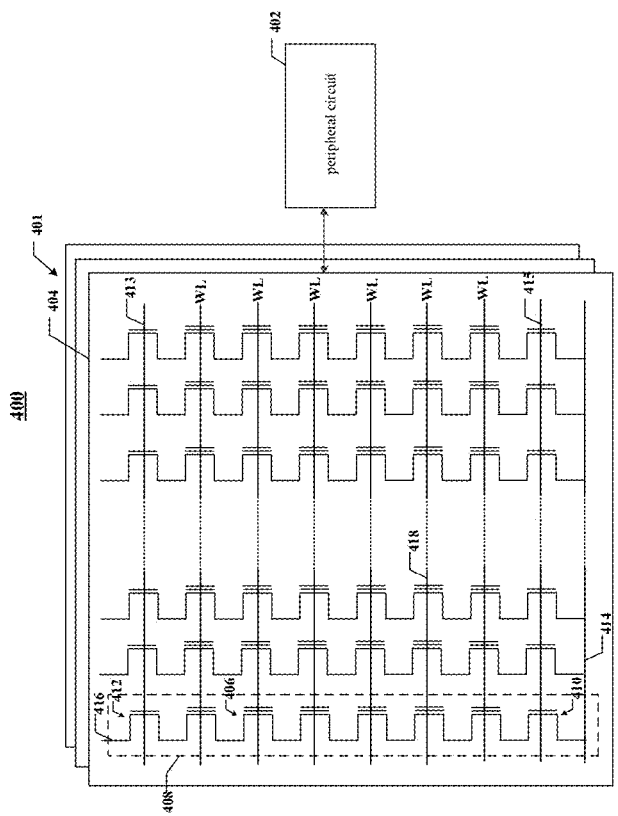
FIG. 4 is a schematic diagram of an example memory device including a peripheral circuit provided by an example of the present application.

Taking three-dimensional NAND flash memory as an example to illustrate the memory device, see FIG. 4, which illustrates a schematic circuit diagram of an example memory device 400 including peripheral circuit in accordance with some aspects of the present application. Memory device 400 may be an example of memory device 104 in FIG. 1. The memory device 400 may include a memory device array 401 and peripheral circuit 402 coupled to the memory array 401. Taking memory array 401 being a three-dimensional NAND memory array as an example for illustration, where memory cells 406 are provided in an array of NAND memory strings 408, each NAND memory string 408 extending vertically over a substrate (not shown). In some implementations, each NAND memory string 408 includes a plurality of memory cells 406 coupled in series and stacked vertically. Each memory cell 406 may retain a continuous analog value, e.g., voltage or charge, depending on the number of electrons trapped within the area of the memory cell 406. Each memory cell 406 may be a "floating gate" type memory cell including a floating gate transistor, or a "charge trap" type memory cell including a charge trap transistor.

In some implementations, each memory cell 406 is a Single-level Cell (SLC) that has two possible memory states and may thus store one bit of data. For example, a first memory state of "0" may correspond to a first voltage range, and a second memory state of "1" may correspond to a second voltage range. In some implementations, each memory cell 406 is a Multi-Level Cell (MLC) capable of storing more than a single bit of data in more than four memory states. For example, an MLC may store two bits per cell, three bits per cell (also known as a Trinary-Level Cell (TLC)), four bits per cell (also known as a Quad-Level Cell (QLC)), or five bits per cell (also known as a Penta-level cell (PLC)). Each MLC may be programmed to assume a range of possible nominal storage values. In one example, if each MLC stores two bits of data, the MLC may be programmed to assume one of three possible programming levels from the erased state through writing one of three possible nominal storage values into the cell, a fourth nominal storage value may be used for the erase state.

As shown in FIG. 4, each NAND memory string 408 may include a lower selection gate (BSG) 410 at its source terminal and an upper selection gate (TSG) 412 at its drain terminal. BSG 410 and TSG 412 may be configured to activate a selected NAND memory string 408 during read and programming operations. In some implementations, the sources of NAND memory strings 408 in a same memory block 404 are coupled through a same source line (SL) 414 (e.g., a common SL). In other words, in accordance with some implementations, all NAND memory strings 408 in a same memory block 404 have an array common source (ACS). In accordance with some implementations, TSG 412 of each NAND memory string 408 is coupled to a corresponding bit line (BL) 416 from which data may be read or written via an output bus (not shown). In some implementations, each NAND memory string 408 is configured to be selected or deselected through at least one of applying a select voltage (e.g., above the threshold voltage of a transistor with a TSG 412) or a deselect voltage (e.g., 0V) to the corresponding TSG 412 via one or more TSG lines 413 or applying a select voltage (e.g., above the threshold voltage of a transistor with a BSG 410) or a deselect voltage (e.g., 0V) to the corresponding BSG 410 via one or more BSG lines 415.

As also shown in FIG. 4, NAND memory string 408 may be organized into a plurality of memory blocks 404 each of which may have a common source line 414 (e.g., coupled to ground). In some implementations, each memory block 404 is the basic data unit for an erase operation, i.e., all memory cells 406 on the same memory block 404 are erased simultaneously. To erase the memory cell 406 in the selected memory block 404, the source line 414 coupled to the selected memory block 404 and to the unselected memory blocks 404 in the same plane as the selected memory block 404 may be biased with an erase voltage (Vers) (e.g., a high positive voltage (e.g., 20V or higher)). It may be understood that, in some examples, erase operations may be performed at the half-memory block level, at the quarter-memory block level, or at a level with any suitable number of memory blocks or any suitable fraction of memory blocks. Memory cells 406 of adjacent NAND memory strings 408 may be coupled through a word line 418 that selects which row of memory cells 406 is affected by read and program operations.

Figure 5:
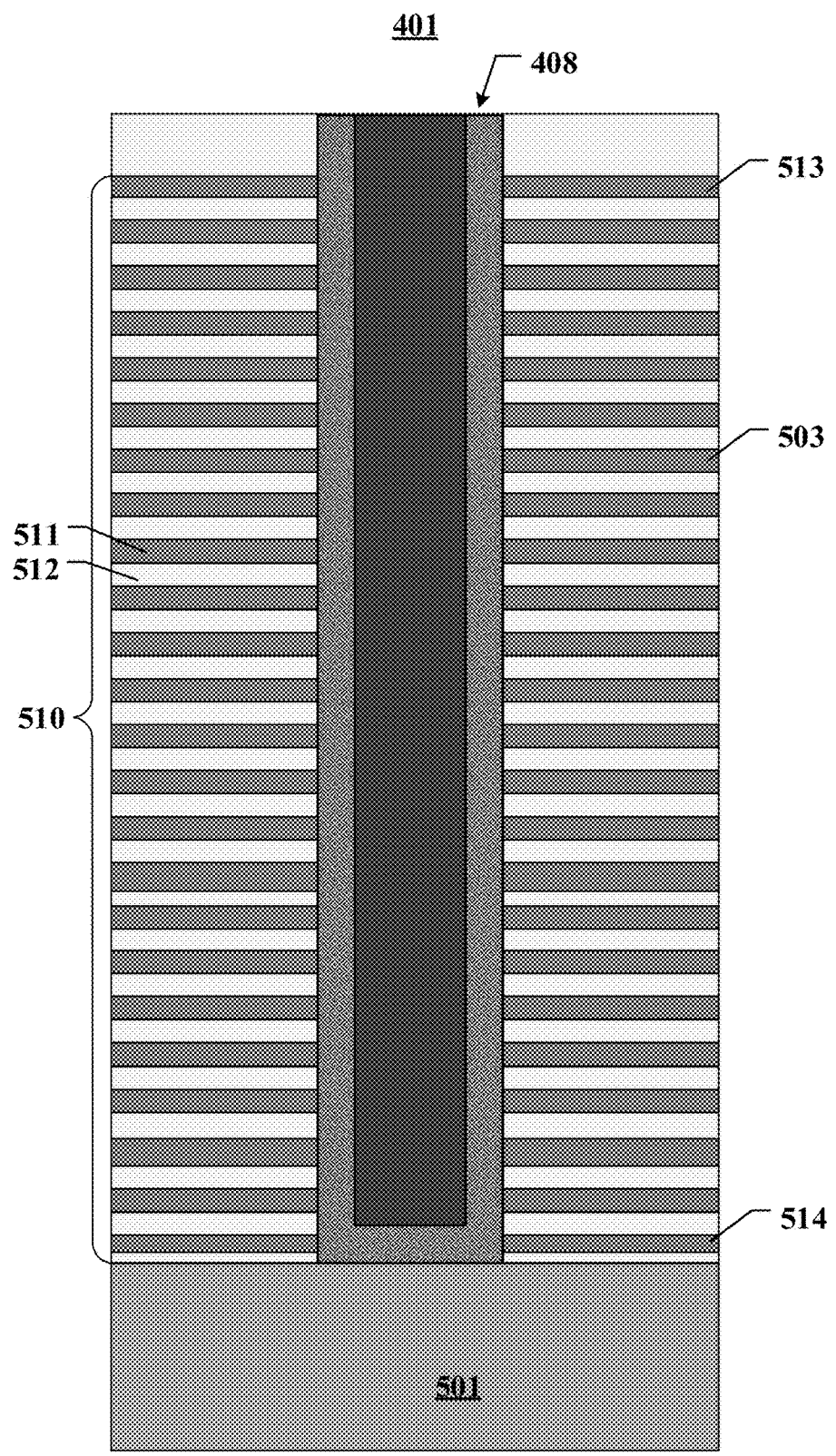
FIG. 5 is a schematic cross-sectional view of a memory array including NAND-type memory strings provided by an example of the present application.

FIG. 5 illustrates a schematic cross-sectional view of an example memory array 401 including NAND memory strings 408 in accordance with some aspects of the present application. As shown in FIG. 5, the NAND memory string 408 may include a stacked structure 510, the stacked structure 510 includes a plurality of gate layers 511 and a plurality of insulating layers 512 alternately stacked in sequence, and memory string 408 vertically penetrating through gate layers 511 and insulating layers 512. Gate layers 511 and the insulating layers 512 may be stacked alternately, and two adjacent gate layers 511 are separated by an insulating layer 512. The number of pairs of gate layer 511 and insulating layer 512 in the stacked structure 510 may determine the number of memory cells included in the memory array 401.

A constituent material of the gate layer 511 may include a conductive material. Conductive materials include, but are not limited to, tungsten (W), cobalt (Co), copper (Cu), aluminum (Al), polysilicon, doped silicon, silicide, or any combination thereof. In some examples, each gate layer 511 includes a metal layer, e.g., a tungsten layer. In some examples, each gate layer 511 includes a doped polysilicon layer. Each gate layer 511 may include a control gate surrounding a memory cell. A gate layer 511 at the top of a stacked structure 510 may extend laterally as an upper select gate line 513, a gate layer 511 at the bottom of a stacked structure 510 may extend laterally as a lower select gate line 514, and a gate layer 511 extending laterally between an upper select gate line and a lower select gate line may serve as a word line layer 503.

In some examples, a stacked structure 510 may be disposed on a substrate 501. The substrate 501 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, NAND memory string 408 includes a channel structure extending vertically through stacked structure 510. In some implementations, a channel structure includes a channel hole filled with semiconductor material (s) (e.g., as a semiconductor channel) and dielectric material (s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). In accordance with some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A blocking layer may include silicon oxide, silicon oxynitride, a high-k (high-k) dielectric, or any combination thereof. In an example, a memory film may include a composite layer of silicon oxide/silicon oxynitride/silicon oxide (ONO).

Figure 6:
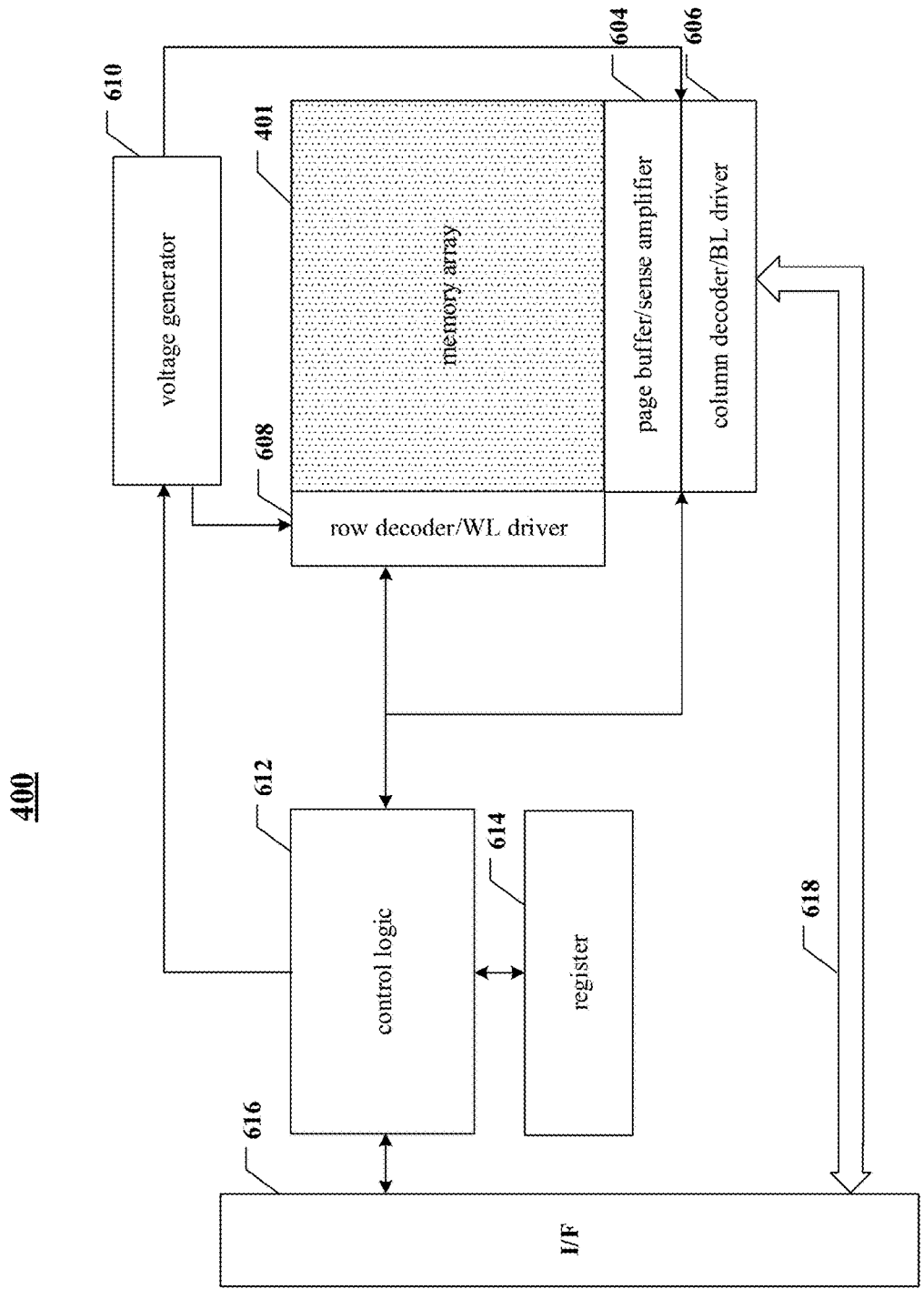
FIG. 6 is a schematic diagram of an example memory device including a memory array and peripheral circuits provided by an example of the present application.

Referring back to FIG. 4, the peripheral circuit 402 may be coupled to the memory array 401 through the bit line 416, word line 418, source line 414, BSG line 415, and TSG line 413. The peripheral circuit 402 may include any suitable analog, digital, and mixed-signal circuit for facilitating operation of the memory array 401 through applying at least one of a voltage signal or a current signal to and sensing at least one of a voltage signal or a current signal from each target memory cell 406 via bit line 416, word line 418, source line 414, BSG line 415, and TSG line 413. The peripheral circuit 402 may include various types of peripheral circuits formed with metal-oxide-semiconductor (MOS) technology. For example, FIG. 6 illustrates some example peripheral circuits, peripheral circuit 402 includes page buffer/sense amplifier 604, column decoder/bit line driver 606, row decoder/word line driver 608, voltage generator 610, control logic 612, register 614, interface 616 and data bus 618. It may be understood that in some examples, additional peripheral circuits not shown in FIG. 6 may also be included.

The page buffer/sense amplifier 604 may be configured to read data from and program (write) data to the memory array 401 in accordance with control signals from the control logic 612. In one example, the page buffer/sense amplifier 604 may store program data (written data) to be programmed into the memory array 401. In another example, page buffer/sense amplifier 604 may perform a program verify operation to ensure that data has been correctly programmed into memory cell 406 coupled to selected word line 418. In yet another example, page buffer/sense amplifier 604 may also sense a low power signal from bit line 416 representing a data bit stored in memory cell 406 and amplify a small voltage swing to a recognizable logic level during a read operation. The column decoder/bit line driver 606 may be configured to be controlled by control logic 612 and to select one or more NAND memory strings 408 through applying a bit line voltage generated from voltage generator 610.

The row decoder/word line driver 608 may be configured to be controlled by control logic 612 and select/deselect memory block 404 of memory array 401 and select/deselect word line 418 of memory block 404. The row decoder/word line driver 608 may also be configured to drive word line 418 with a word line voltage generated from voltage generator 610. In some implementations, the row decoder/word line driver 608 may also select/deselect and drive the BSG line 415 and the TSG line 413. The row decoder/word line driver 608 may be configured to perform programming operations on the memory cells 406 coupled to the selected word line 418. The voltage generator 610 may be configured to be controlled by the control logic 612, and generate word line voltage (e.g., read voltage, programming voltage, pass voltage, channel boost voltage, verify voltage, etc.), bit line voltage and source line voltage to be supplied to the memory array 401.

The control logic 612 may be coupled to each of the peripheral circuits described above, e.g., voltage generator 610, row decoder/word line driver 608, etc., and configured to control operations of each of the peripheral circuits. The register 614 may be coupled to the control logic 612 and include status register, command register and address register for storing status information, command operation code (OP code) and command address for controlling operations of each of the peripheral circuits. The interface 616 may be coupled to control logic 612 and act as a control buffer to buffer and relay control commands received from a host (not shown) to control logic 612 and to buffer and relay status information received from the control logic 612 to the host. The interface 616 may also be coupled to column decoder/bit line driver 606 via data bus 618 and act as a data I/O interface and data buffer to buffer and relay data to/from memory array 401.

In the aforementioned memory device and memory system, when the memory I/F employs NV-DDR, NV-DDR2, NV-DDR3 and NV-LPDDR4 interfaces, the data transmission rate may employ Double Data Rate (DDR) method of transmission. In this case, the rising and falling edges of the data strobe (DQS, DQ-Strobe) signal are for taking samples of the data (DQ) signals. Therefore, the quality of DQS signal is an important factor restricting data transmission. In some examples, an evaluation index for the quality of a DQS signal may be the duty cycle of the DQS signal, and if the duty cycle of the DQS signal may remain stable, the DQS signal may be considered to be relatively good. Here, the duty cycle may refer to the ratio of the time the DQS signal is in a high level (or low level) state to the total cycle within a cycle, usually expressed as a percentage. Since in the memory system, the duty cycle of the DQS signal changes with the system process, voltage, and temperature (PVT, Process Voltage Temperature), the efficiency of data transmission is limited, seriously affecting the efficiency of the write operation.

In order to solve one or more of the problems described above, an example of the present application provides a method for operating a memory system, which employs the new function in the ONFI protocol, Write Duty Cycle Adjustment (WDCA), configures the adjustment code for the duty cycle adjustment of the DQS signal in the memory device, and then adjusts the duty cycle of the DQS signal. This not only enables the memory system to adapt to changes in PVT, but also makes the adjustment of the duty cycle of the DQS signal flexible.

Figure 7:
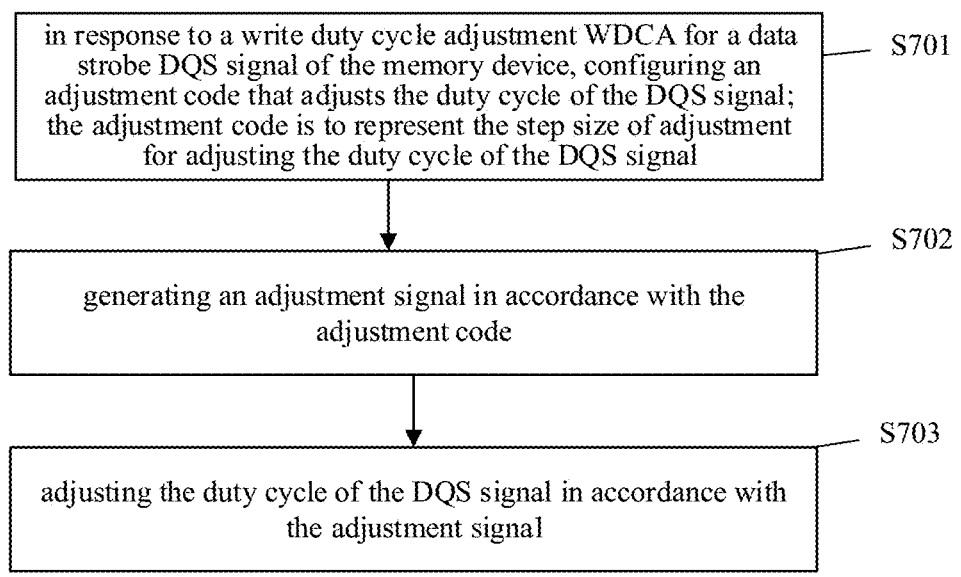
FIG. 7 is a schematic flowchart of a method for operating a memory system provided by an example of the present application.

In one example, as shown in FIG. 7, the operation method may include:

S701: in response to a write duty cycle adjustment WDCA for a data strobe DQS signal of the memory device, configuring an adjustment code that adjusts the duty cycle of the DQS signal; the adjustment code is to represent the step size of adjustment for adjusting the duty cycle of the DQS signal;

S702: generating an adjustment signal in accordance with the adjustment code;

S703: adjusting the duty cycle of the DQS signal in accordance with the adjustment signal.

Here, the memory device supports the open NAND flash interface ONFI protocol, and the adjustment code is set into the memory device in accordance with a Set Feature command in the ONFI protocol.

It may be noted that WDCA is an optional and new feature of ONFI5.1. This feature provides a way to compensate for the duty cycle loss of the DQS signal in the input NAND type memory device, and may configure the adjustment code which adjusts the duty cycle of the DQS signal into the memory device through the Set Feature command (such as Fa24h). In turn, the memory device generates an adjustment signal in accordance with the configured adjustment code, and adjusts the duty cycle of the DQS signal in accordance with the adjustment signal. That is, the operation method provided by the example of the present application may be an implementation method of employing the WDCA function to adjust the duty cycle of the DQS signal.

Figure 8:
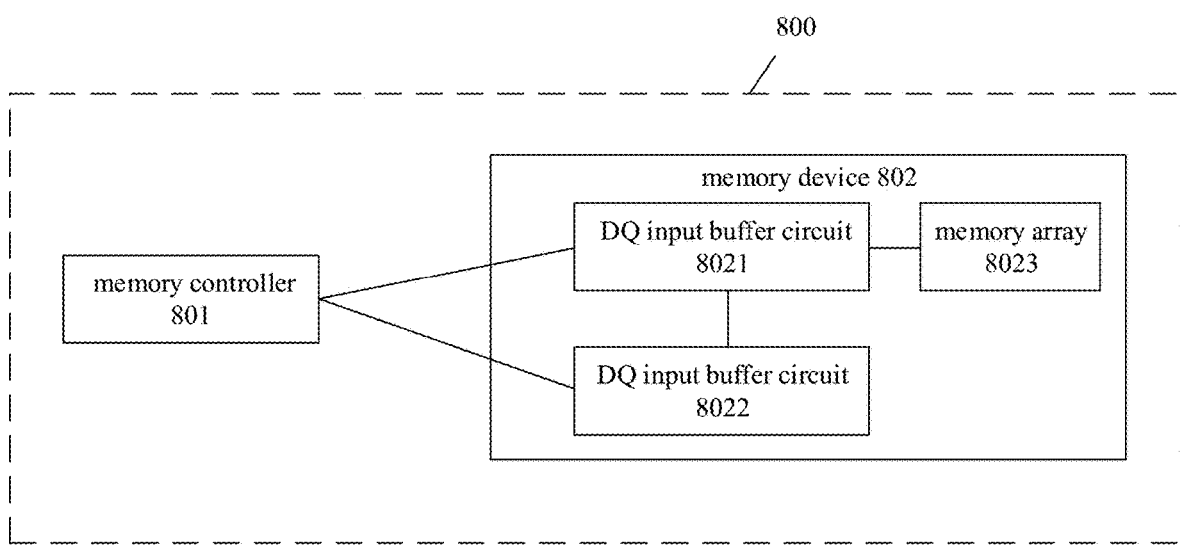
FIG. 8 is a schematic diagram of the relationship between the DQ signal and the DQS signal in the memory system provided by an example of the present application.

In one example, when data is written into the memory device, the memory controller sends a DQS signal to the memory device, and the memory device uses the DQS signal to achieve data synchronization. In one example, as shown in FIG. 8, in the memory system 800, during the write process, the DQS signal and the data signal DQ are transmitted to the memory device 802 by the memory controller 801 at the approximately same speed over transmission paths of the approximately same length. In the memory device 802, DQS input buffer circuit 8022 transmits the received DQS signal to DQ input buffer circuit 8021. The DQ input buffer circuit 8021 captures data in accordance with the rising edge and falling edge of the DQS signal, and stores the data into the memory cells in the memory array 8023 of the memory device. For example, DQS(0) changes to DQS(1) or DQS(1) changes to DQS(0), and every time the DQS signal changes, the DQS input buffer circuit 8022 captures the data once in accordance with the above change and stores the data into the memory cell. In the actual operating process, the DQS signal may be adjusted before being used, to ensure that the duty cycle of the DQS signal remains stable. That is, the DQS input buffer circuit 8022 may also receive an adjustment signal which is to adjust the duty cycle of the DQS signal, in order to adjust the duty cycle of the DQS signal, that is, operation S703 in FIG. 7 is performed.

In some examples, operation S702 in FIG. 7 may be performed in a digital-to-analog converter (DAC) of the memory device, that is, the DAC receives the adjustment code and generates an adjustment signal in accordance with the adjustment code. The adjustment signal may include an analog reference voltage signal.

Figure 9:
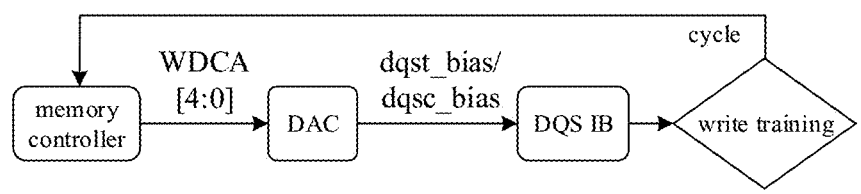
FIG. 9 is a schematic flowchart of operations of an operation method provided by an example of the present application.
Figure 10:
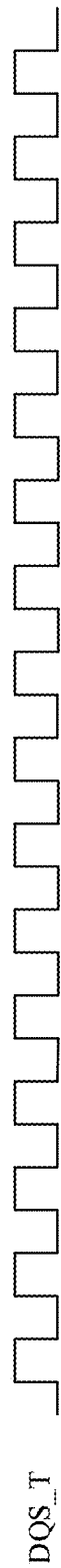
FIGS. 10 and 11 are two different forms of DQS signals provided by an example of the present application.
Figure 11:
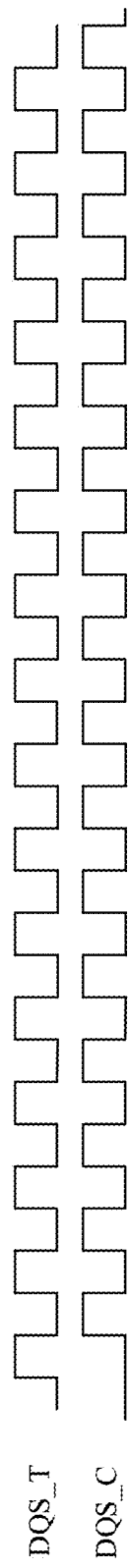
Figure 14:
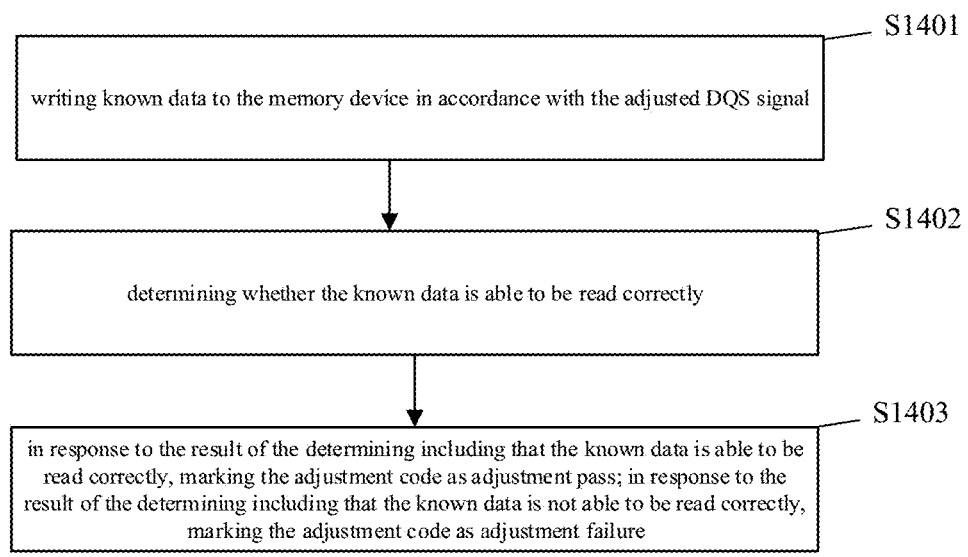
FIG. 14 is a schematic flowchart of another operation method for a memory system provided by an example of the present application.

In one example, in some examples, the aforementioned adjustment process described in FIG. 7 may be as shown in FIG. 9, including: the first operation, the memory controller configures an adjustment code (e.g., WDCA [4:0]) for the memory device; the second operation, the memory device reads the adjustment code and inputs the adjustment code into a DAC included in the memory device, the DAC generates an adjustment signal (such as dqst_bias/dqsc_bias) in accordance with the adjustment code and transmits the adjustment signal to the DQS IB included in the memory device (such as DQS input buffer circuit 8022); the third operation, DQS IB adjusts the duty cycle of the DQS signal; then, with the aid of write training, the subsequent operation S1401 shown in FIG. 14 is performed, and the first data signal that have been read is fed back to the memory controller, such that the memory controller compares the first data signal and the obtained second data signal to verify a result of the adjustment. It may be noted that the DQS signal mentioned here may include a single-ended signal or a differential signal. Wherein as shown in FIG. 10 and FIG. 11, a single-ended DQS signal, DQS_T is described in FIG. 10; a differential DQS, DQS_T/DQS_C is described in FIG. 11. The following only takes an example that a differential DQS signal is generated to illustrate the method of adjusting in the present application.

Wherein the DAC may include a plurality of sub-DAC modules, and each sub-DAC module includes a plurality of parallel-connected MOS transistors. Here, the MOS transistors may include NMOS or PMOS, but the types of MOS transistors in a same sub-DAC module are the same. Each sub-DAC module is configured to generate adjustment signals in accordance with different adjustment codes, and adjust at least one of the rising edge or falling edge of the DQS signal to increase or decrease the duty cycle of the DQS signal.

Figure 12:
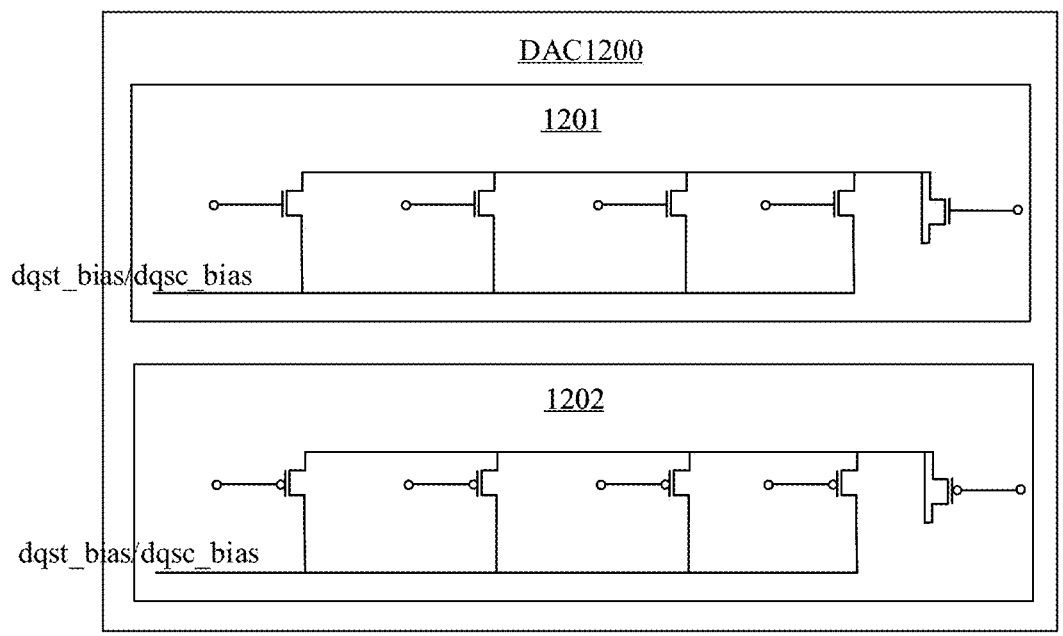
FIG. 12 is a structure schematic diagram of a DAC provided by an example of the present application.
Figure 13:
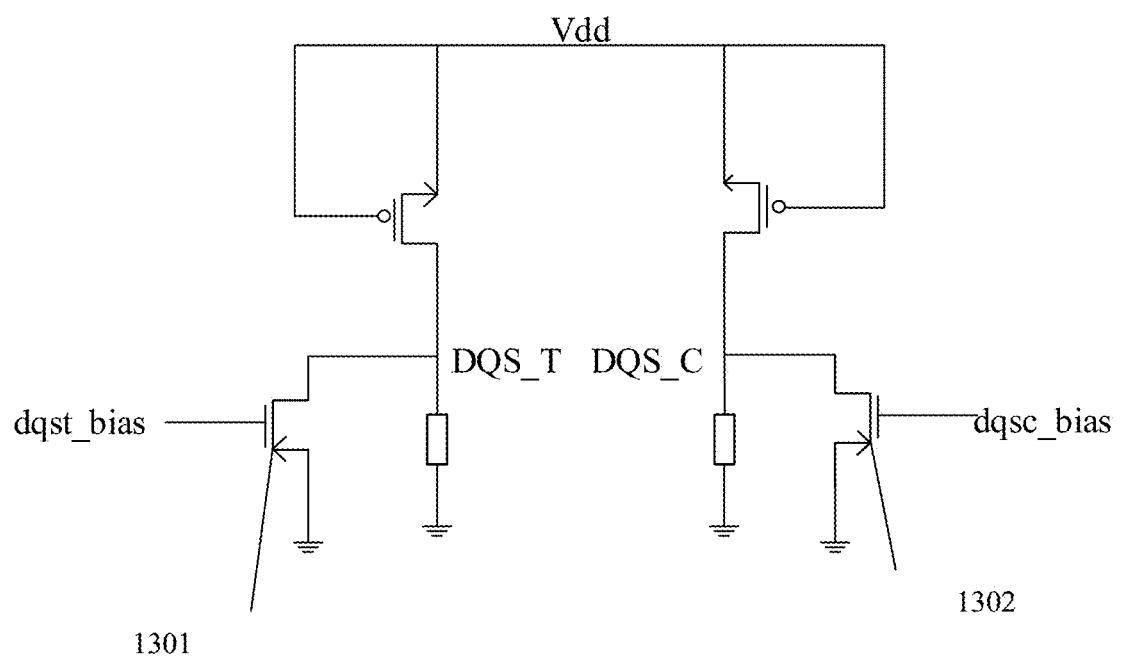
FIG. 13 is a structure schematic diagram of a DQS input buffer circuit provided by an example of the present application.

For example, as shown in FIG. 12, the DAC 1200 may include: a first sub-DAC module 1201 and a second sub-DAC module 1202, wherein the MOS transistor in the first sub-DAC module 1201 includes an NMOS and is configured to: access the adjustment code in the negative direction to generate an adjustment signal in the negative direction, so that the duty cycle of the DQS signal is adjusted in the decreasing direction, wherein the control end of each NMOS accesses one bit of the adjustment code; the MOS transistor of the second sub-DAC module includes PMOS and is configured to: access the adjustment code in the positive direction to generate an adjustment signal in the positive direction, so that the duty cycle of the DQS signal is adjusted in an increasing direction, wherein the control end of each PMOS accesses one bit of the adjustment code. Moreover, each sub-DAC module comprises 5 MOS transistors connected in parallel, wherein one MOS transistor in each set of parallel MOS transistors receives the highest bit of the adjustment code to determine the direction of adjustment, e.g., in the first sub-DAC module, the operation of accessing the highest bit of the adjustment code by the control end of the NMOS is outlined in the dotted line; the remaining 4 MOS transistors in each set of MOS transistors connected in parallel receive the remaining lower 4 bits to determine the step size of adjustment, e.g., the 4 NMOS outside the dotted box in the first sub-DAC module are to access the lower 4 bits of the adjustment code to determine the step size of adjustment. Finally, a reference voltage signal in the negative direction is generated through the first sub-DAC module; a reference voltage signal in the positive direction is generated through the second sub-DAC module.

Wherein for the DQS input buffer circuit 8022, in one example, an implementation is shown in FIG. 13, the DQS input buffer circuit 8022 may include: a first NMOS 1301 and a second NMOS 1302, wherein the first NMOS 1301 accesses the adjustment signal dqst_bias (first reference voltage signal) sent from the DAC; the second NMOS 1302 accesses the adjustment signal dqsc_bias (second reference voltage signal) sent from the DAC. Wherein, the phase difference between the first reference voltage signal and the second reference voltage signal is 180°, and the first reference voltage signal includes at least one of a reference voltage signal in a negative direction which is generated via the first sub-DAC module or a reference voltage signal in a positive direction which is generated via the second sub-DAC module, thereby, the first reference voltage signal is accessed via the first NMOS and the duty cycle of the DQS signal is adjusted to increase or decrease the duty cycle of the DQS signal; the second reference voltage signal includes at least one of a reference voltage signal in a negative direction which is generated via the first sub-DAC module or a reference voltage signal in a positive direction which is generated via the second sub-DAC module, thereby, the second reference voltage signal is accessed via the second NMOS and the duty cycle of the DQS signal is adjusted to increase or decrease the duty cycle of the DQS signal. It may be noted that the first NMOS 1301 and the second NMOS 1302 are two switching transistors of a same type, in other words, the left and right branches in FIG. 13 are symmetrical. In FIG. 13, two PMOS connected to the power supply Vdd are also included; and two resistive devices connected to the ground are also included. These devices are the basic elements for achieving duty cycle adjustment. It may be understood that the DQS input buffer circuit 8022 may also include other devices to optimize the duty cycle adjustment circuit, the duty cycle adjustment circuit is not limited here, and only FIG. 13 is taken as an example to illustrate its implementation principle.

In order to understand the result of the duty cycle adjustment of the DQS signal, in some examples, as shown in FIG. 14, the WDCA may also include:
  S1401: writing known data to the memory device in accordance with the adjusted DQS signal;
  S1402: determining whether the known data is able to be read correctly;

S1403: in response to the result of the determining including that the known data is able to be read correctly, marking the adjustment code as adjustment pass; in response to the result of the determining including that the known data is not able to be read correctly, marking the adjustment code as adjustment failure.

Figure 15:
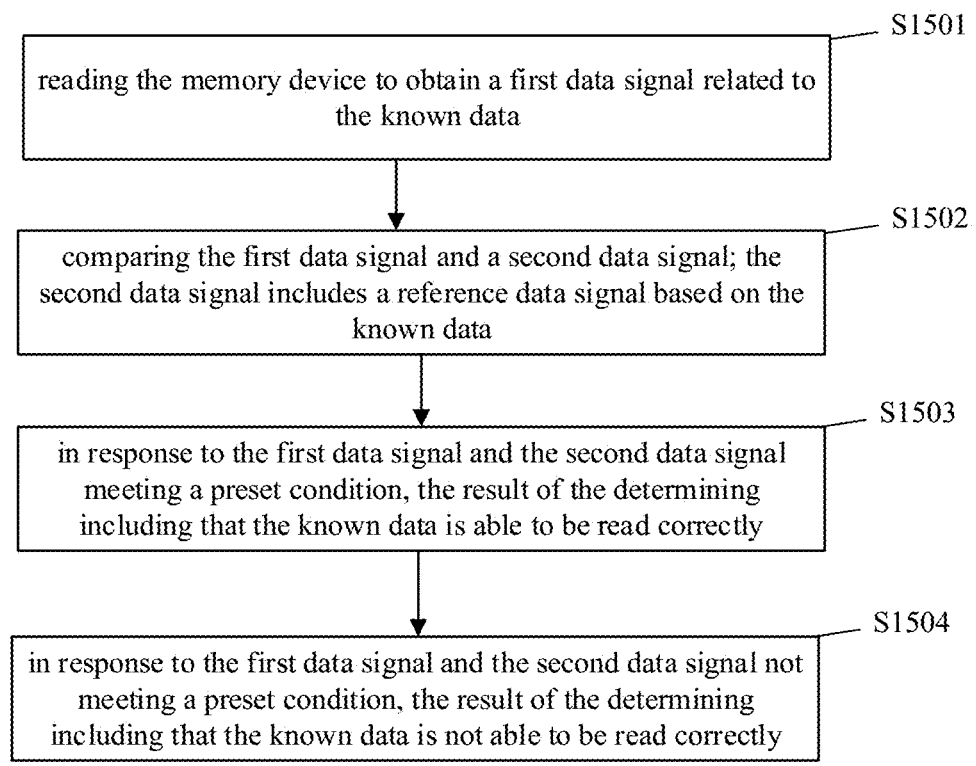
FIG. 15 is a schematic flowchart of detailed operations for S1402 provided by an example of the present application.

It may be noted that the adjustment of the duty cycle of the DQS signal has been described previously, then the result of the adjustment is to be determined. A detection method may include the operations shown in FIG. 14: writing the known data into the memory device in accordance with the adjusted DQS signal, and then determining whether the known data is able to be read correctly; if the result of the determining includes that the known data is able to be read correctly, marking the adjustment code as adjustment pass; if the result of the determining includes that the known data is able to be read correctly, marking the adjustment code as adjustment pass;

Here, the S1402, as shown in FIG. 15, may include:
S1501: reading the memory device to obtain a first data signal related to the known data;
S1502: comparing the first data signal and a second data signal; the second data signal includes a reference data signal based on the known data;
S1503: in response to the first data signal and the second data signal meeting a preset condition, the result of the determining including that the known data is able to be read correctly;
S1504: in response to the first data signal and the second data signal not meeting a preset condition, the result of the determining including that the known data is not able to be read correctly.

It may be noted that the understanding of S1501 may include: after previously writing the known data into the memory device in accordance with the adjusted DQS signal, the memory device is read to obtain the first data signal, that is, the first data signal here is the read data signal by reading the known data stored in the memory device. Here, said reference data signal may refer to a signal that is read after the known data being written into the memory device at a rate lower than the rate at which the known data is written into the memory device in accordance with the adjusted DQS signal, e.g., the period of writing at a certain rate is 10 ns, the writing rate is slow but the accuracy is high. Then, the second data signal is taken as a reference data signal to be compared with the first data signal to determine whether the first data signal is correctly read. Here, said known data may refer to data which is predefined in the ONFI protocol for writing training data or user-defined data to be written to the memory device.

In one example, the first data signal and the second data signal are compared, and if the first data signal and the second data signal meet a preset condition, the result of the determining includes that the known data is able to be read correctly; or, if the first data signal and the second data signal do not meet the preset conditions, the result of the determining includes that the known data is not able to be read correctly.

Here, the preset condition is met, if the similarity between the first data signal and the second data signal is not less than the preset threshold; the preset condition is not met, if the similarity between the first data signal and the second data signal is less than the preset threshold. For example, assuming that the preset threshold is set to 0.9, then the similarity between the first data signal and the second data signal is greater than or equal to 0.9 indicates that the preset condition is met; the similarity between the first data signal and the second data signal is less than 0.9 indicates that the preset condition is not met. The similarity between the first data signal and the second data signal may be determined by converting the first data signal and the second data signal into two signal sequences, and then calculating the correlation coefficient of the two signal sequences. The correlation coefficient ranges from 0 to 1, and the closer it is to 1, the more relevant the two signal sequences are; and the closer it is to 0, the smaller the correlation between the two signal sequences. In this case, the more relevant the two signal sequences are, the greater the similarity between the first data signal and the second data signal is; instead, the smaller the correlation between the two signal sequences is, the less the similarity between the first data signal and the second data signal is.

In some examples, the method may further include:
in response to the end of the current WDCA, determining whether a number of times that the WDCA is performed reaches a set number;
in response to the number of times that the WDCA is performed not reaching the set number, initiating a next WDCA; stopping initiating a next WDCA until the number of times that the WDCA is performed reaches the set number;
wherein the step sizes of adjustment represented by the adjustment codes in WDCAs are different from each other.

It may be noted that for one WDCA, the result includes two cases, the WDCA is marked as adjustment pass, or adjustment failure; and, for one WDCA, it is also unknown whether the adjusted DQS signal is able to ensure data is correctly written within the entire variation range of PVT. Therefore, in actual application, in order to obtain the best DQS signal, WDCA may be performed multiple times, and the step sizes of adjustment of WDCAs may be different from each other to obtain the DQS signal with the best duty cycle. That is, in the actual adjustment process, the operations described in FIG. 7 and FIG. 14 are performed in cycle, but the step sizes of adjustment represented by the adjustment codes are different from each other.

It may be understood that the cycle may not be proceeded indefinitely. Initiating a next WDCA is stopped when a number of times that the WDCA is performed reaches the set number. Here, the set number may be set by the designer in accordance with the actual situation. In one example, a manner of setting may be in accordance with the number of bits of DAC included in the memory device (which determines how many bits the adjustment code contains), e.g., if the number of DAC is 5 bits, in this case, the highest bit indicates the adjustment direction (a positive direction or negative direction), the remaining 4 bits are to indicate the step size of adjustment for the adjustment code, which is able to achieve a total of 32 different step sizes of adjustments from −16 to 16. The description of the adjustment direction may be described in detail later and may not be repeated here.

Figure 16:
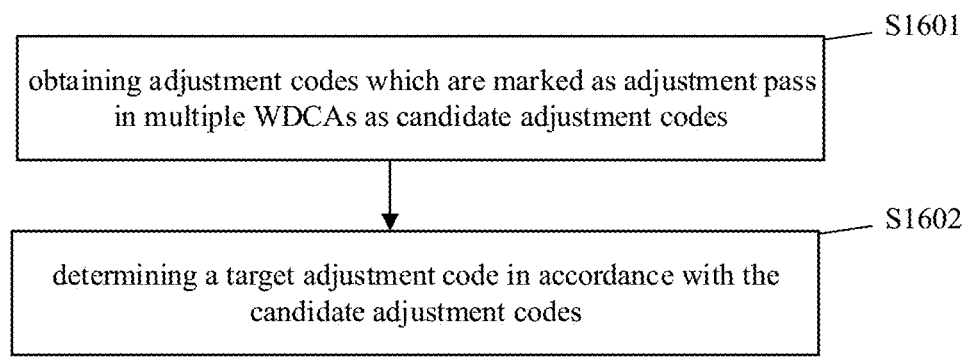
FIG. 16 is a schematic flowchart of still another operation method for a memory system provided by an example of the present application.

In some examples, as shown in FIG. 16, the method may further include:
S1601: obtaining adjustment codes which are marked as adjustment pass in multiple WDCAs as candidate adjustment codes;
S1602: determining a target adjustment code in accordance with the candidate adjustment codes;
wherein the target adjustment code is to generate a target DQS signal; data is able to be correctly written into the memory device based on the target DQS signal within the variation range of PVT in the memory device.

It may be noted that the detailed operations for selecting the DQS signal with the best duty cycle, i.e., selecting the target adjustment code are illustrated here. Then, the adjusted DQS signal obtained in accordance with the target adjustment code is the DQS signal with the best duty cycle (or referred to as the target DQS signal).

Here the plurality of adjustment codes in the multiple WDCAs may include adjustment codes in positive and negative directions;

wherein at least one of the rising edge or falling edge of the DQS signal is adjusted in accordance with the adjustment code in the positive direction to increase the duty cycle of the DQS signal; at least one of the rising edge or falling edge of the DQS signal is adjusted in accordance with the adjustment code in the negative direction to reduce the duty cycle of the DQS signal.

wherein the adjustment code may include a plurality of bits; wherein the highest bit is to indicate whether the adjustment code is an adjustment code in a positive or negative direction; remaining bits are to indicate the step size of adjustment for the adjustment code.

In one example, the adjustment code includes 5 bits, wherein the highest bit is to indicate whether the adjustment code is an adjustment code in a positive or negative direction; remaining 4 bits are to indicate the step size of adjustment for the adjustment code; wherein the adjustment code is able to achieve a total of 32 different step sizes of adjustment from −16 to 16.

Referring back to FIG. 16, in one example, the operation of selecting the target adjustment code may include: firstly, selecting adjustment codes which are marked as adjustment pass as candidate adjustment codes, and then obtaining the target adjustment code in accordance with the candidate adjustment codes.

In one example, S1602 may include:
determining a group of candidate codes which contains the largest number of consecutive candidate adjustment codes;
determining the target adjustment code from the group of candidate codes;
wherein, any of candidate adjustment codes in the group of candidate codes is determined to be the target adjustment code; or a candidate adjustment code which is close to the middle position in the group of candidate codes is determined to be the target adjustment code.

It may be noted that the consecutive candidate adjustment codes mentioned here may mean that the step sizes of adjustment corresponding to the candidate adjustment codes are continuously increasing or decreasing.

For example, assuming that the adjustment code includes the aforementioned 5 bits, wherein in one example, the corresponding relationship between the adjustment code and the step size of adjustment may include: 00000b: 0 step; 00001b: +1 step; 00010b to 0111b: +2 step to +15 step; 10000b: 0 step; 10001b: −1 step; 10010b to 11111b: −2 step to −15 step. In this case, after performing 32 WDCAs, if the selected candidate adjustment codes include: 00001b: +1 step; 00010 b~01000b: +2 step to +8 step; 01100b~01110 b: +12 step to +14 step; 10010 b~10100 b: −2 step to −4 step. Here, the group of candidate codes is also 00010 b~01000b: +2 step to +8 step. The target adjustment code is selected from the above.

In one example, any of candidate adjustment codes in the group of candidate codes is determined to be the target adjustment code; or a candidate adjustment code which is close to the middle position in the group of candidate codes is determined to be the target adjustment code. For example, for the previously determined 00010 b~01000b: +2 step to +8 step, the target adjustment code may be any one of 00010 b~01000b: +2 step to +8 step or close to the middle position 00101b: +5 step.

It may be noted that the time instance of starting the operation method of the example of the present application may be after completing the read training. In one example, FIG. 17 is referred, which shows a schematic diagram of operation flow of a memory system provided by an example of the present application.

Figure 17:
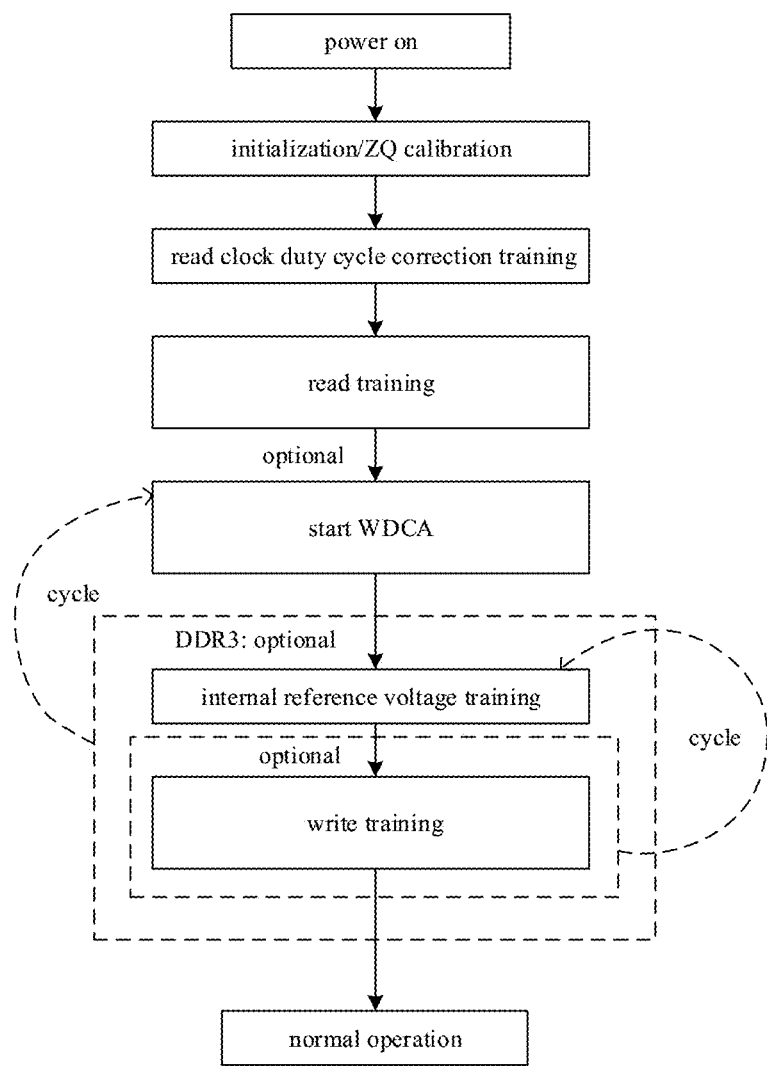
FIG. 17 is a work flowchart of a memory system, including the operation method proposed by the present application, provided by an example of the present application.

In FIG. 17, when the memory system is powered on, after initialization/ZQ calibration, read clock duty cycle correction (DCC) training, and read training, WDCA is initiated, and the internal reference voltage and write training may be used to assist adjustment of the duty cycle of the DQS signal. After completing the adjustment of the duty cycle of the DQS signal, write training may be performed, and then the memory system may initiate normal operations. The operations of adjusting the duty cycle of the DQS signal with the assistance of WDCA and write training have been described in detail above and may not be repeated here. It may be noted that, in one example, the WDCA and write training may be functions performed by the memory device. Wherein the memory device described here may support the DDR3 interface.

The operation method provided by the example of the present application, when the memory system supports ONFI5.1, adopts the newly developed function included in ONFI5.1, WDCA, to configure the adjustment code for adjusting the DQS signal to the memory device, so that the memory device may obtain the adjustment code by reading internally to adjust the duty cycle of the DQS signal; and WDCA may configure a plurality of adjustment codes. Thereby, the operation method provided by the example of the present application may adjust the duty cycle of the DQS signal multiple times by performing the writing training and adjustment code configuration repeatedly, to obtain the DQS signal with at least one of the best rising edge or falling edge as the PVT changes, so that data is able to be written correctly within the entire variation range of PVT to ensure the writing performance of the memory system.

Based on the inventive concept described above, an example of the present disclosure also provides a memory system including: one or more memory devices;
and a memory controller which is coupled to the memory device and controls the memory device; wherein,
the memory controller is configured to: in response to a write duty cycle adjustment WDCA being performed for a write data strobe DQS signal of the memory device, configure an adjustment code that adjusts the duty cycle of the DQS signal into the memory device; the adjustment code is to represent the step size of adjustment for adjusting the duty cycle of the DQS signal;
the memory device is configured to: obtain the adjustment code; generate an adjustment signal in accordance with the adjustment code; adjust the duty cycle of the DQS signal in accordance with the adjustment signal.

In the scheme described above, the memory device a peripheral circuit configured to: in response to a set command, configure the adjustment code into a first register included in the peripheral circuit; access the first register to obtain the adjustment code; generate an adjustment signal in accordance with the adjustment code; adjust the duty cycle of the DQS signal in accordance with the adjustment signal.

Wherein the first register here may include one or more of the registers 614 shown in FIG. 6.

In the scheme described above, the peripheral circuit includes: a control logic sub-circuit, a digital-to-analog conversion sub-circuit and a DQS input buffer sub-circuit, wherein, the control logic sub-circuit is configured to: access the first register to obtain the adjustment code; transmit the adjustment code to the digital-to-analog conversion sub-circuit;

the digital-to-analog conversion sub-circuit is configured to: receive the adjustment code; generate an adjustment signal in accordance with the adjustment code; the adjustment signal includes a reference voltage signal;

the DQS input buffer sub-circuit is configured to adjust the duty cycle of the DQS signal in accordance with the reference voltage signal.

It may be noted that the control logic sub-circuit here may be part or several parts of the control logic 612 shown in FIG. 6. The structure and function of the digital-to-analog conversion sub-circuit may be the same as the aforementioned DAC. The structure and function of the DQS input buffer sub-circuit may be the same as the aforementioned DQS input buffer circuit.

In the scheme described above, the memory device further includes a memory array; the memory array is coupled to the peripheral circuit and controlled by the peripheral circuit;

the memory controller is further configured to: send a write command;

the peripheral circuit is further configured to: in response to the write command, write known data to the memory array in accordance with the adjusted DQS signal;

the memory controller is further configured to: send a read command;

the peripheral circuit is further configured to: in response to the read command, feed back to the memory controller a first data signal related to the known data;

the memory controller is further configured to: determine whether the known data is able to be read correctly in accordance with the first data signal and the second data signal; in response to the result of the determining including that the known data is able to be read correctly, marking the adjustment code as adjustment pass; in response to the result of the determining including that the known data is not able to be read correctly, marking the adjustment code as adjustment failure; wherein the second data signal includes a reference data signal based on the known data.

In the scheme described above, the memory controller is further configured to: in response to the end of the current WDCA, determine whether a number of times that the WDCA is performed reaches a set number;

in response to the number of times that the WDCA is performed not reaching the set number, initiate a next WDCA; stop initiating a next WDCA until the number of times that the WDCA is performed reaches the set number;

wherein the step sizes of adjustment represented by the adjustment codes in WDCAs are different from each other.

In the scheme described above, the memory controller is further configured to: obtain adjustment codes which are marked as adjustment pass in multiple WDCAs as candidate adjustment codes;

determine a target adjustment code in accordance with the candidate adjustment codes;

wherein the target adjustment code is to generate a target DQS signal; data is able to be correctly written into the memory device based on the target DQS signal within the variation range of PVT in the memory device.

In the scheme described above, the memory device is configured to: support an open NAND flash interface ONFI protocol; the set command includes a Set Feature command in the ONFI protocol.

In the scheme described above, the memory controller is further configured to: compare the first data signal and the second data signal;

in response to the first data signal and the second data signal meeting a preset condition, the result of the determining including that the known data is able to be read correctly;

in response to the first data signal and the second data signal not meeting a preset condition, the result of the determining including that the known data is not able to be read correctly.

In the scheme described above, the plurality of adjustment codes in the multiple WDCAs include adjustment codes in positive and negative directions;

wherein at least one of the rising edge or falling edge of the DQS signal is adjusted in accordance with the adjustment code in the positive direction to increase the duty cycle of the DQS signal; at least one of the rising edge or falling edge of the DQS signal is adjusted in accordance with the adjustment code in the negative direction to reduce the duty cycle of the DQS signal.

It may be noted that a memory system provided by an example of the present application may perform the operation method described above, therefore, the nouns and features appearing in the description of the memory system provided by the example of the present application have been described in detail in the foregoing and may not be described again here. Furthermore, for other structures in the memory device and memory controller described here, reference may be made to the description of the memory device and memory controller described in FIGS. 1 to 6, and may not be repeated here.

The above description is intended to be illustrative and not restrictive. For example, the examples described above (or one or more aspects thereof) may be used in combination with each other. Other examples may be used, such as those available to one of ordinary skill in the art upon reading the above description. It may be understood that it may not be used to interpret or limit the scope or meaning of the claims. Furthermore, in the above detailed description, various features may be combined together to simplify the present application. This should not be construed to mean that an unclaimed disclosed feature is essential to any claim. Rather, disclosed subject matter may lie in less than all features of a particular disclosed example. Therefore, the following claims are hereby incorporated into the Detailed Description, with each claim standing on its own as a separate example, and it is contemplated that these examples may be combined with one another in various combinations or permutations. The scope of the present application may be determined with reference to the appended claims, along with the full scope of equivalents to which such claims are entitled.

What is claimed is:

1. A method for operating a memory system including a memory device and a memory controller coupled to the memory device, comprising:

in response to a write duty cycle adjustment (WDCA) being performed for a data strobe (DQS) signal of the memory device, configuring, by the memory controller, an adjustment code that adjusts a duty cycle of the DQS signal, wherein the adjustment code comprises a plurality of bits including: i) a first bit indicates whether the adjustment code is an adjustment code in a positive or negative direction and ii) one or more remaining bits indicating a step size of adjustment for adjusting the duty cycle of the DQS signal;

obtaining, by the memory device, the adjustment code from the memory controller;

generating, by the memory device, an adjustment signal in accordance with the adjustment code; and adjusting, by the memory device, the duty cycle of the DQS signal in accordance with the adjustment signal.

2. The method of claim 1, wherein the WDCA comprises: writing known data to the memory device in accordance with the adjusted DQS signal;

determining whether the known data is able to be read correctly; and performing one of the following:
  in response to determining that the known data is able to be read correctly, marking the adjustment code as adjustment pass; or
  in response to determining that the known data is not able to be read correctly, marking the adjustment code as adjustment failure.

3. The method of claim 2, wherein the determining whether the known data is able to be read correctly comprises:

reading the memory device to obtain a first data signal related to the known data;

comparing the first data signal and a second data signal that is a reference data signal based on the known data; and performing one of the following:
  in response to the first data signal and the second data signal meeting a preset condition, determining that the known data is able to be read correctly; or
  in response to the first data signal and the second data signal not meeting a preset condition, determining that the known data is not able to be read correctly.

4. The method of claim 2, further comprising:
in response to an end of a current WDCA, determining whether a number of times that the WDCA is performed reaches a set number;
in response to the number of times that the WDCA is performed not reaching the set number, initiating a next WDCA; and
stopping initiating the next WDCA until the number of times that the WDCA is performed reaches the set number;
wherein the step sizes of adjustment represented by the adjustment codes in WDCAs are different from each other.

5. The method of claim 4, further comprising:
obtain adjustment codes that are marked as adjustment pass in multiple WDCAs as candidate adjustment codes; and
determine a target adjustment code in accordance with the candidate adjustment codes;
wherein the target adjustment code is to generate a target DQS signal; data is able to be correctly written into the memory device based on the target DQS signal within a variation range of Process Voltage Temperature (PVT) in the memory device.

6. The method of claim 5, wherein the determining a target adjustment code in accordance with the candidate adjustment codes comprises:
determining a group of candidate codes that include a largest number of consecutive candidate adjustment codes; and
determining the target adjustment code from the group of candidate codes;
wherein, one of candidate adjustment codes in the group of candidate codes is determined to be the target adjustment code; or
a candidate adjustment code that is close to a middle position in the group of candidate codes is determined to be the target adjustment code.

7. The method of claim 4, wherein a plurality of adjustment codes in multiple WDCAs include adjustment codes in positive and negative directions;
wherein at least one of a rising edge or a falling edge of the DQS signal is adjusted in accordance with the adjustment code in the positive direction to increase the duty cycle of the DQS signal; and
at least one of the rising edge or falling edge of the DQS signal is adjusted in accordance with the adjustment code in the negative direction to reduce the duty cycle of the DQS signal.

8. The method of claim 1, wherein the memory device supports an open NAND flash interface (ONFI) protocol, and the adjustment code is set into the memory device in accordance with a Set Feature command in the ONFI protocol.

9. The method of claim 1, wherein the adjustment code includes 5 bits, wherein a highest bit indicates whether the adjustment code is an adjustment code in a positive or negative direction; remaining 4 bits indicate the step size of adjustment for the adjustment code; wherein the adjustment code is configured to achieve a total of 32 different step sizes of adjustments from −16 to 16.

10. The method of claim 1, wherein the DQS signal includes a single-ended signal or a differential signal.

11. A memory system, including:
a memory controller that is coupled to one or more memory devices, wherein the memory controller is configured to control the one or more memory devices, and the memory controller is configured to:
  in response to a write duty cycle adjustment (WDCA) being performed for a write data strobe (DQS) signal of a memory device of the one or more memory devices, configure an adjustment code that adjusts the duty cycle of the DQS signal into the memory device, wherein the adjustment code comprises a plurality of bits including: i) a first bit indicates whether the adjustment code is an adjustment code in a positive or negative direction and ii) one or more remaining bits indicating a step size of adjustment for adjusting the duty cycle of the DQS signal; and
wherein the memory device of the one or more memory devices are configured to:
  obtain the adjustment code from the memory controller;
  generate an adjustment signal in accordance with the adjustment code; and
  adjust the duty cycle of the DQS signal in accordance with the adjustment signal.

12. The memory system of claim 11, wherein the memory device comprises a peripheral circuit that is configured to:

in response to a set command, configure the adjustment code into a first register included in the peripheral circuit;
access the first register to obtain the adjustment code;
generate the adjustment signal in accordance with the adjustment code; and
adjust the duty cycle of the DQS signal in accordance with the adjustment signal.

13. The memory system of claim 12, wherein the peripheral circuit comprises:
a control logic sub-circuit that is configured to:
access the first register to obtain the adjustment code; and
transmit the adjustment code to a digital-to-analog conversion sub-circuit;
the digital-to-analog conversion sub-circuit that is configured to:
receive the adjustment code; and
generate the adjustment signal in accordance with the adjustment code, wherein the adjustment signal includes a reference voltage signal; and
a DQS input buffer sub-circuit that is configured to:
adjust the duty cycle of the DQS signal in accordance with the reference voltage signal.

14. The memory system of claim 12, wherein the memory device further comprises a memory array that is coupled to the peripheral circuit and controlled by the peripheral circuit;
the memory controller is further configured to: send a write command;
the peripheral circuit is further configured to: in response to the write command, write known data to the memory array in accordance with the adjusted DQS signal;
the memory controller is further configured to: send a read command;
the peripheral circuit is further configured to: in response to the read command, feed back to the memory controller a first data signal related to the known data;
the memory controller is further configured to:
determine whether the known data is able to be read correctly in accordance with the first data signal and a second data signal, wherein the second data signal is a reference data signal based on the known data; and perform one of the following:
in response to determining that the known data is able to be read correctly, mark the adjustment code as adjustment pass; or
in response to determining that the known data is not able to be read correctly, mark the adjustment code as adjustment failure;
wherein the second data signal includes a reference data signal based on the known data.

15. The memory system of claim 14, wherein the memory controller is further configured to:
in response to an end of a current WDCA, determining whether a number of times that the WDCA is performed reaches a set number;
in response to the number of times that the WDCA is performed not reaching the set number, initiating a next WDCA; and
stopping initiating a next WDCA until the number of times that the WDCA is performed reaches the set number;
wherein the step sizes of adjustment represented by the adjustment codes in WDCAs are different from each other.

16. The memory system of claim 15, wherein the memory controller is further configured to:
obtain adjustment codes that are marked as adjustment pass in multiple WDCAs as candidate adjustment codes; and
determine a target adjustment code in accordance with the candidate adjustment codes;
wherein the target adjustment code is to generate a target DQS signal; and data is able to be correctly written into the memory device based on the target DQS signal within a variation range of Process Voltage Temperature (PVT) in the memory device.

17. The memory system of claim 15, wherein a plurality of adjustment codes in multiple WDCAs include adjustment codes in positive and negative directions;
wherein at least one of a rising edge or falling edge of the DQS signal is adjusted in accordance with the adjustment code in the positive direction to increase the duty cycle of the DQS signal; and
at least one of the rising edge or falling edge of the DQS signal is adjusted in accordance with the adjustment code in the negative direction to reduce the duty cycle of the DQS signal.

18. The memory system of claim 14, wherein the memory controller is further configured to:
compare the first data signal and the second data signal; and
perform one of the following:
in response to the first data signal and the second data signal meeting a preset condition, determine that the known data is able to be read correctly; and
in response to the first data signal and the second data signal not meeting a preset condition, determine that the known data is not able to be read correctly.

19. The memory system of claim 12, wherein the memory device is configured to: support an open NAND flash interface (ONFI) protocol; the set command includes a Set Feature command in the ONFI protocol.

20. A method for operating a memory system including a memory device, comprising:
in response to a write duty cycle adjustment (WDCA) being performed for a data strobe (DQS) signal of the memory device, configuring an adjustment code that adjusts a duty cycle of the DQS signal, wherein the adjustment code represents a step size of adjustment for adjusting the duty cycle of the DQS signal;
generating an adjustment signal in accordance with the adjustment code; and
adjusting the duty cycle of the DQS signal in accordance with the adjustment signal, wherein
the WDCA comprises:
writing known data to the memory device in accordance with the adjusted DQS signal;
determining whether the known data is able to be read correctly; and
performing one of:
in response to determining that the known data is able to be read correctly, marking the adjustment code as adjustment pass; or
in response to determining that the known data is not able to be read correctly, marking the adjustment code as adjustment failure.

* * * * *